(12) United States Patent
Chen et al.

(10) Patent No.: US 11,493,965 B2
(45) Date of Patent: Nov. 8, 2022

(54) BIASING MEMBERS FOR COMPUTING DEVICES

(71) Applicant: Hewlett-Packard Development Company, L.P., Spring, TX (US)

(72) Inventors: Wen-Chih Chen, Taipei (TW); Po-Feng Chuang, Taipei (TW); Jian-Ming Chen, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/279,214

(22) PCT Filed: Nov. 30, 2018

(86) PCT No.: PCT/US2018/063433
§ 371 (c)(1),
(2) Date: Mar. 24, 2021

(87) PCT Pub. No.: WO2020/112146
PCT Pub. Date: Jun. 4, 2020

(65) Prior Publication Data
US 2022/0035403 A1 Feb. 3, 2022

(51) Int. Cl.
*G06F 1/16* (2006.01)
*G06F 1/18* (2006.01)

(52) U.S. Cl.
CPC ............ *G06F 1/166* (2013.01); *G06F 1/1616* (2013.01); *G06F 1/1626* (2013.01); *G06F 1/182* (2013.01)

(58) Field of Classification Search
CPC combination set(s) only.
See application file for complete search history.

(56) References Cited

U.S. PATENT DOCUMENTS

| | | | |
|---|---|---|---|
| 6,097,595 A * | 8/2000 | Cipolla | G06F 1/166 248/688 |
| 8,139,357 B2 | 3/2012 | Trang | |
| 8,213,177 B2 * | 7/2012 | Uttermann | H05K 5/0234 248/188.8 |
| 8,879,251 B2 * | 11/2014 | Hsiu | G06F 1/166 361/679.59 |
| 8,941,990 B2 * | 1/2015 | Uttermann | H05K 5/0234 248/188.8 |
| 8,995,117 B1 | 3/2015 | Hayashida et al. | |
| 9,030,820 B2 * | 5/2015 | Guo | G06F 1/203 361/679.59 |
| 9,348,363 B2 * | 5/2016 | Hui | G06F 1/1626 |
| 9,612,626 B2 | 4/2017 | Onda | |
| 9,727,092 B1 * | 8/2017 | Gerbus | G06F 1/1681 |
| 9,823,631 B1 | 11/2017 | Loo et al. | |

(Continued)

FOREIGN PATENT DOCUMENTS

| KR | 20-2012-0007731 U | 11/2012 |
|---|---|---|
| TW | 200833218 A | 8/2008 |
| TW | 201248367 A | 12/2012 |

*Primary Examiner* — Lisa Lea-Edmonds
(74) *Attorney, Agent, or Firm* — Conley Rose PC

(57) ABSTRACT

Example computing devices are disclosed herein that include a housing member that is to be placed on a support surface. The housing member includes an internal cavity and a biasing member mounted within the internal cavity. The biasing member is to engage with an inner surface of the internal cavity to deform the inner surface.

15 Claims, 7 Drawing Sheets

(56) References Cited

U.S. PATENT DOCUMENTS

| | | | |
|---|---|---|---|
| 2010/0315773 A1* | 12/2010 | Senatori | H05K 5/0234 361/679.55 |
| 2010/0328859 A1 | 12/2010 | Chang | |
| 2012/0187810 A1 | 7/2012 | Iwamoto et al. | |
| 2013/0208436 A1* | 8/2013 | Hu | G06F 1/1643 361/807 |
| 2015/0036289 A1 | 2/2015 | Aurongzeb et al. | |
| 2015/0293562 A1* | 10/2015 | Nakamura | G06F 1/166 361/679.27 |
| 2017/0023984 A1 | 1/2017 | Krahn | |

\* cited by examiner

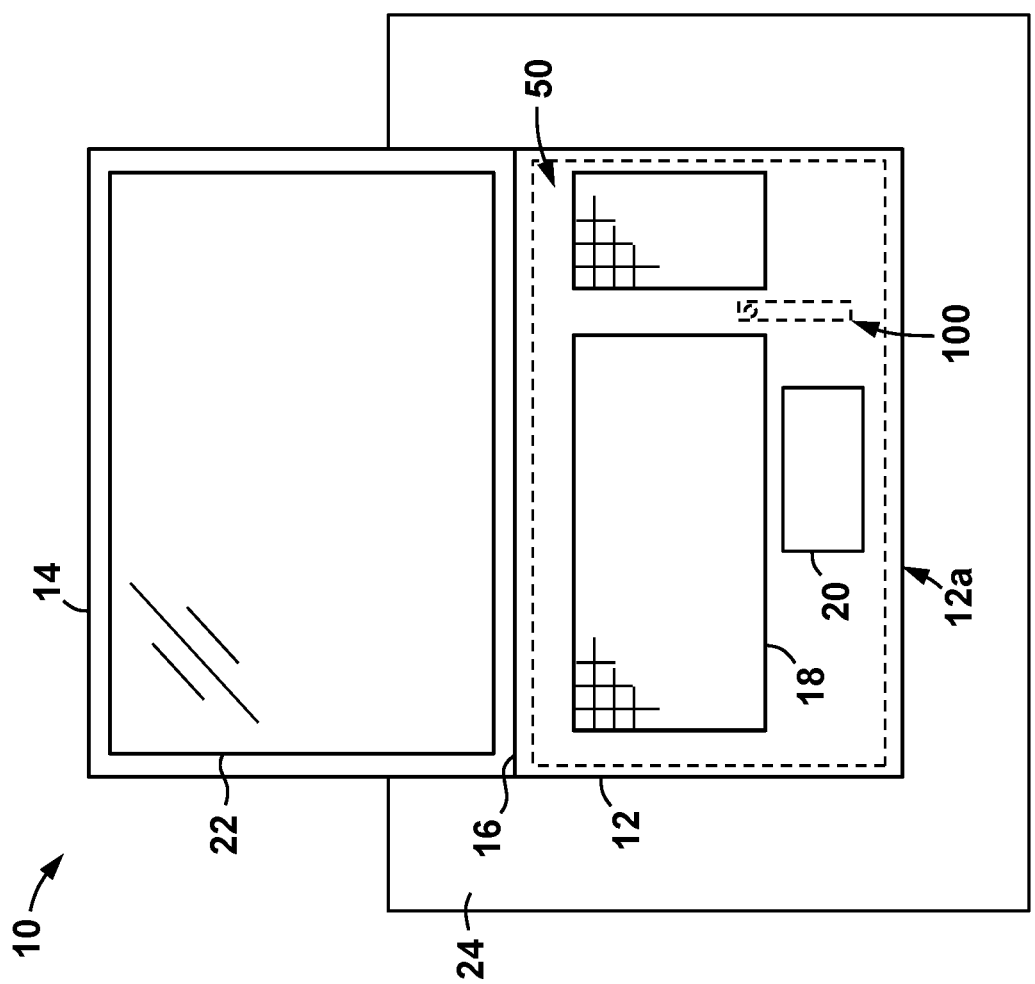

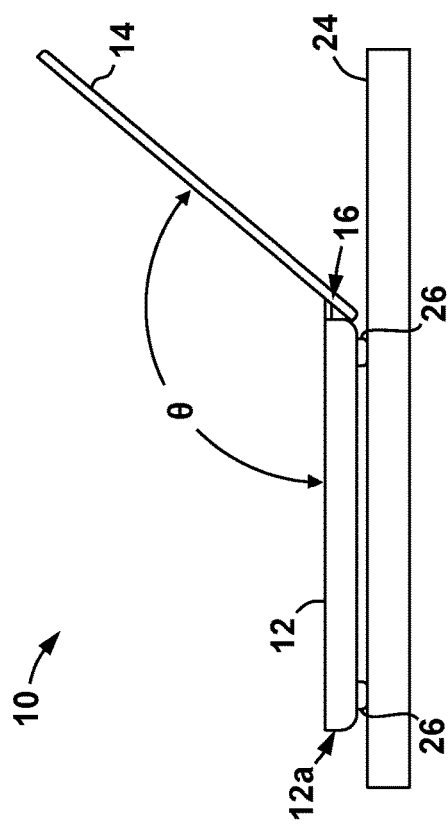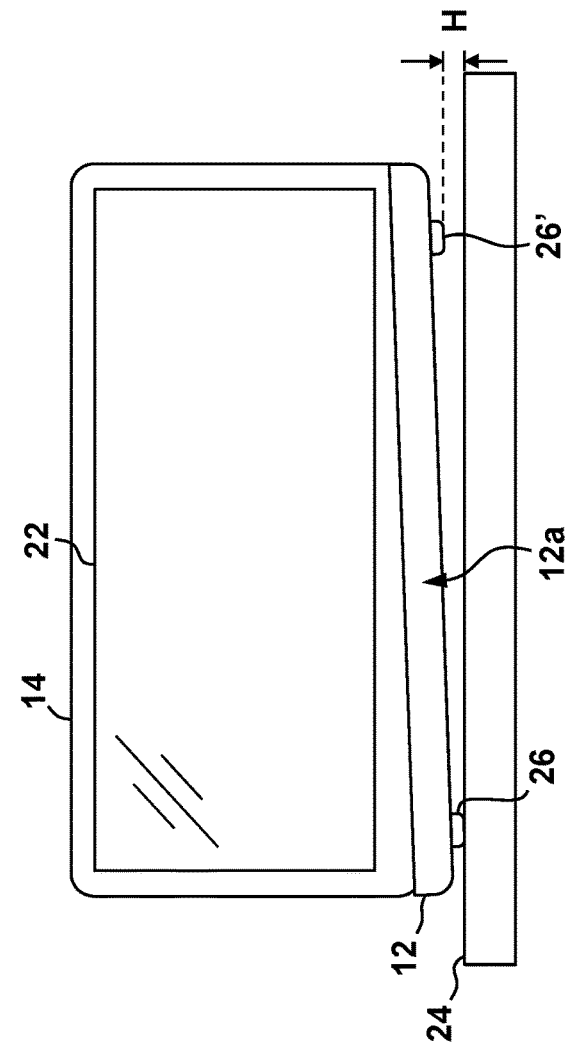

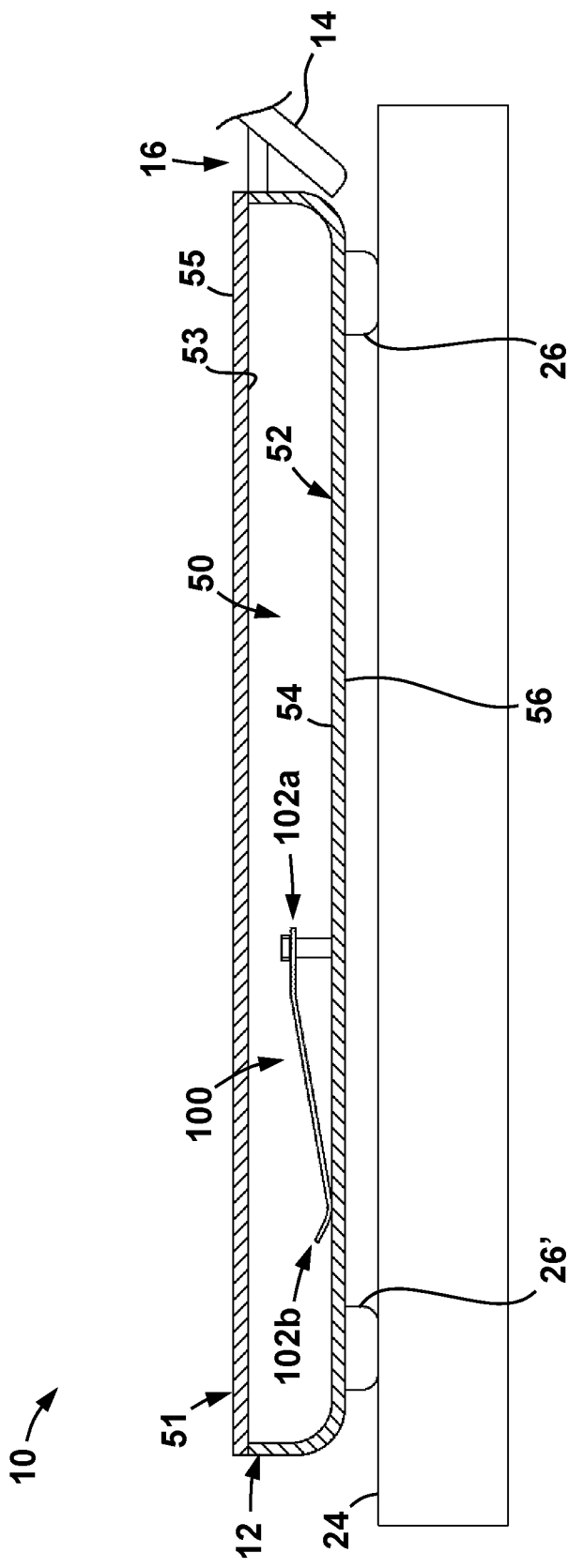

BIASING MEMBERS FOR COMPUTING DEVICES

BACKGROUND

Computing devices may be disposed on a support surface to facilitate the operation thereof. The support surface may include the top surface of a table, a desk, a counter-top, the floor, etc. As a result, some portion of the computing device is to bear against the support surface during these operations.

BRIEF DESCRIPTION OF THE DRAWINGS

Various examples will be described below referring to the following figures:

FIG. 1 is a top view of a computing device having a biasing member mounted therein according to some examples;

FIG. 2 is a side view of the computing device of FIG. 1 according to some examples;

FIG. 3 is a front view of the computing device of FIG. 1 according to some examples;

FIG. 4 is a side cross-sectional view of the computing device of FIG. 1 according to some examples;

DETAILED DESCRIPTION

Figure 5:
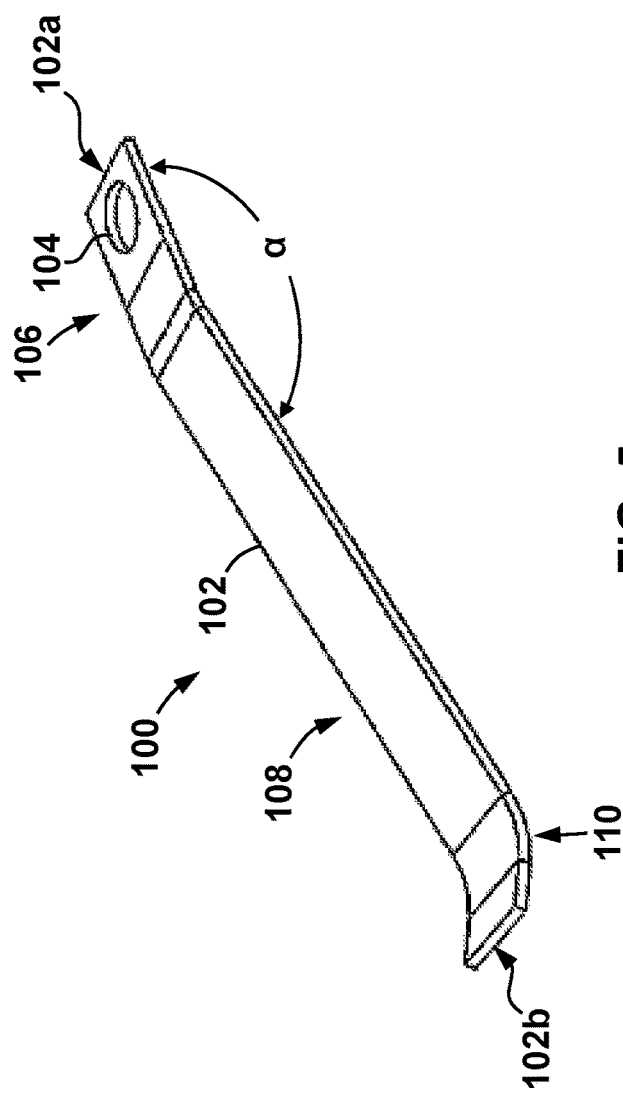
FIG. 5 is a perspective view of a biasing member for use within the computing device of FIG. 1 according to some examples.

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms "axial" and "axially" generally refer to positions along or parallel to a central or longitudinal axis (e.g., central axis of a body or a port), while the terms "radial" and "radially" generally refer to positions located or spaced to the side of the central or longitudinal axis.

As used herein, including in the claims, the word "or" is used in an inclusive manner. For example, "A or B" means any of the following: "A" alone, "B" alone, or both "A" and "B." In addition, when used herein (including in the claims), the words "generally," "about," or "substantially" mean within a range of plus or minus 20% of the stated value. As used herein, the term "computing device" may refer to any suitable device that may execute, generate, or store machine readable instructions. For example, the term "computing device," includes a desk top computer, a lap top computer, a tablet computer, a smart phone, etc. As used herein, the term "biasing member" refers to a resilient member or assembly that may be elastically deformed when placed under load (e.g., compression, tension, deflection, torsion, etc.), and that exerts a reactionary force to resist such deformation. The term biasing member includes springs (e.g., coiled spring, leaf springs, torsion springs, etc.).

As previously described above, computing devices may be disposed on a support surface (e.g., the upper flat surface on a table, desk, countertop, etc.) during operations. In some circumstances, the weight distribution of the computing device (or a portion thereof) may be such that the computing device does not engage evenly or symmetrically with the support surface. As a result, a user may notice a wobble or rocky motion for the computing device during operations (e.g., such as while typing on a keyboard of the computing device).

Accordingly, examples disclosed herein include computing devices with biasing members mounted therein that are to exert a biasing force on a surface of the computing device to encourage engagement of a portion of the computing device with an underlying support surface. Without being limited to this or any other theory, by providing a biasing member with the computing device in this manner, the computing device may engage with an underlying support surface more evenly or symmetrically during operations, so that the stability of the computing device is improved.

Referring now to FIGS. 1 and 2, an example computing device 10 including a biasing member 100 mounted therein is shown disposed on a support surface 24. In this example, computing device 10 is a lap top style computing device and thus includes a first housing member 14 rotatably coupled to a second housing member 12 with a hinge 16. The first housing member 14 supports a display 22 that is to project images for viewing by a user.

The second housing member 12 supports user input devices, such as, for example, a keyboard 18 and a trackpad 20. In addition, as shown in FIG. 1, second housing member 12 also includes an internal cavity 50 defined therein that contains a plurality of electronic components, such as, for example, power sources, processors, memory devices, etc. (not shown in FIG. 1 but discussed in more detail below). As shown in FIGS. 2 and 3, in this example, second housing member 14 also includes a plurality of feet 26 that are to engage with support surface 24 during operations. In this example, feet 26 comprise compliant members that are attached to a bottom surface of second housing member 12 (e.g., lower surface 56 described below). In other examples, no feet 26 are included and second housing member 12 may engage directly with support surface 24. In addition, in this example, second housing member 12 includes a total of four feet 26 attached thereto, with each foot 26 being proximate a corresponding corner of second housing member 12. However, in other examples, different numbers, designs, and arrangements of feet (e.g., feet 26) may be employed. For example, in some examples, feet 26 may be replaced with one or a plurality of elongate members (or raised portions of a lower surface of the second housing member 12) that engage with support surface 24 during operations.

Support surface 24 may comprise any suitable, substantially flat surface that a user may place computing device 10 on. For example, support surface 24 may comprise the top surface of a desk, table, counter-top, bench, etc. As another example, support surface 24 may comprise a floor or even a lap pad, stand or other suitable device or surface that is to support computing device 10 during operations therewith.

Referring now to FIGS. 1-3, during operations, second housing member 12 is disposed on support surface 24 (e.g., such that feet 26 or other suitable portions of second housing member 12 are engaged with support surface 24) and first housing member 14 may be rotated about the hinge 16 to a range of different positions relative to second housing member 12. In particular, first housing member 14 may be rotated about hinge 16 relative to second housing member 12 to adjust an angle θ between housing members 12, 14 about an axis of rotation defined by hinge 16 (not shown).

For instance, first housing 14 may be rotated about hinge 16 toward second housing member 12 so that the angle θ is equal (or substantially equal) to 0°, and the first housing member 14 and second housing member 12 are stacked on one another upon support surface 24. In addition, first housing 14 may also be rotated about hinge 16 away from second housing member 12 so that the angle θ is greater than 0°. In some examples, the first housing member 14 may be rotated about hinge 16 relative to second housing member 12 so that the angle θ is as much as 170° or greater.

Once the angle θ is greater than a threshold value, such as, for example 90°, the first housing member 14 may no longer be disposed above second housing member 12 and may instead be suspended (e.g., partially or wholly) over the support surface 24. From this point, additional increases of angle θ cause the center of gravity of the computing device 10 to shift away from a leading edge 12a of second housing member 12 (which may be the edge of second housing member 12 that is most distal from hinge 16). The weight distribution within second housing member 12 is not typically even or symmetric (e.g., due to an asymmetric arrangement of components within internal cavity 50). Thus, as the center of gravity of computing device 10 shifts farther from leading edge 12a, some of the feet 26 (or some portion of second housing member 12) may disengage from support surface 24. For example, as shown in FIG. 3, one of the feet 26 (which is identified as foot 26' in FIG. 3) is disengaged from support surface 24 and is actually suspended or separated from support surface 24 by a height H. In certain examples, the height H may range from 0.1 to 1.0 mm, or from 0.1 to 0.5 mm depending on the size, shape, weight, and weight distribution of computing device (including first housing member 14 and second housing member 12). Such asymmetric contact between the feet 26 and support surface 24 may result in a wobble or rocking motion of the computing device 10 when the user interacts therewith (e.g., during typing with keyboard 18 or engagement with trackpad 20).

However, as shown in FIG. 1, in this example, a biasing member 100 is disposed within internal cavity 50. As will be described in more detail below, biasing member 100 is to engage with a surface within the internal cavity 50 and transfer a biasing force thereto so foot 26' of second housing member 12 is urged into engagement with the support surface 24. In particular, the biasing force applied within internal cavity 50 of second housing member 12 by biasing member 100 may deform a portion of second housing member 12 so that the separation height H of foot 26' may decrease to zero (or near zero). Thus, biasing member 100 may eliminate or at least reduce any wobble or rocking noticed by a user during interaction with computing device 10 upon support surface 24.

Figure 6:
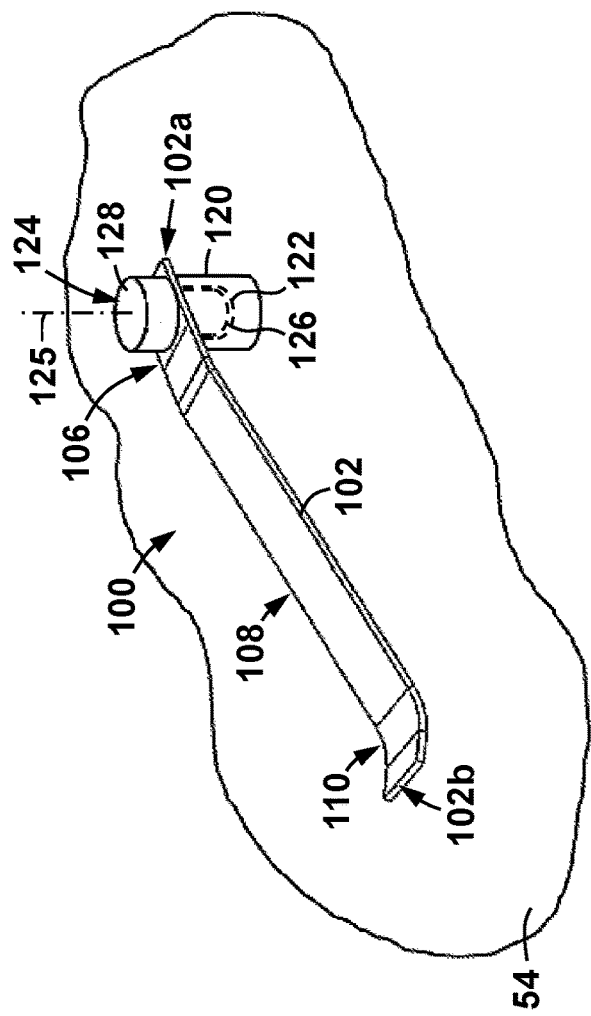
FIG. 6 is a perspective view of the biasing member of FIG. 5 secured to a surface within the computing device of FIG. 1 according to some examples.

Referring now to FIGS. 4-6, in this example biasing member 100 comprises a leaf spring that includes an elongate body 102. Body 102 includes a first or fixed end 102a, and a second or free end 102b distal from fixed end 102a.

In addition, body 102 includes a first or mounting section 106 and a second or engagement section 108. Mounting section 106 extends from fixed end 102a, and engagement section 108 extends linearly from mounting section 106 to free end 102b. Mounting section 106 is generally flat or planar in shape and includes an aperture 104 extending therethrough. Engagement section 108 is also generally flat or planar in shape and includes a curved foot 110 at or proximate free end 102b. As best shown in FIGS. 4 and 5, engagement section 108 extends at an angle α relative to mounting section 106. In the free state, such as when no load or deformation is imparted onto biasing member 100, the angle α may be greater than 90° and less than 180°, such as, for example from about 120° to about 175° or from about 150° to about 175°. In this example, body 102 is constructed from a resilient material that may elastically deform when placed under a load. For example, body 102 may be constructed from a metallic material, such as, for example, steel. However, in other examples, body 102 may be constructed from a non-metallic material, such as, for example, a polymer, a composite, etc.

Figure 7:
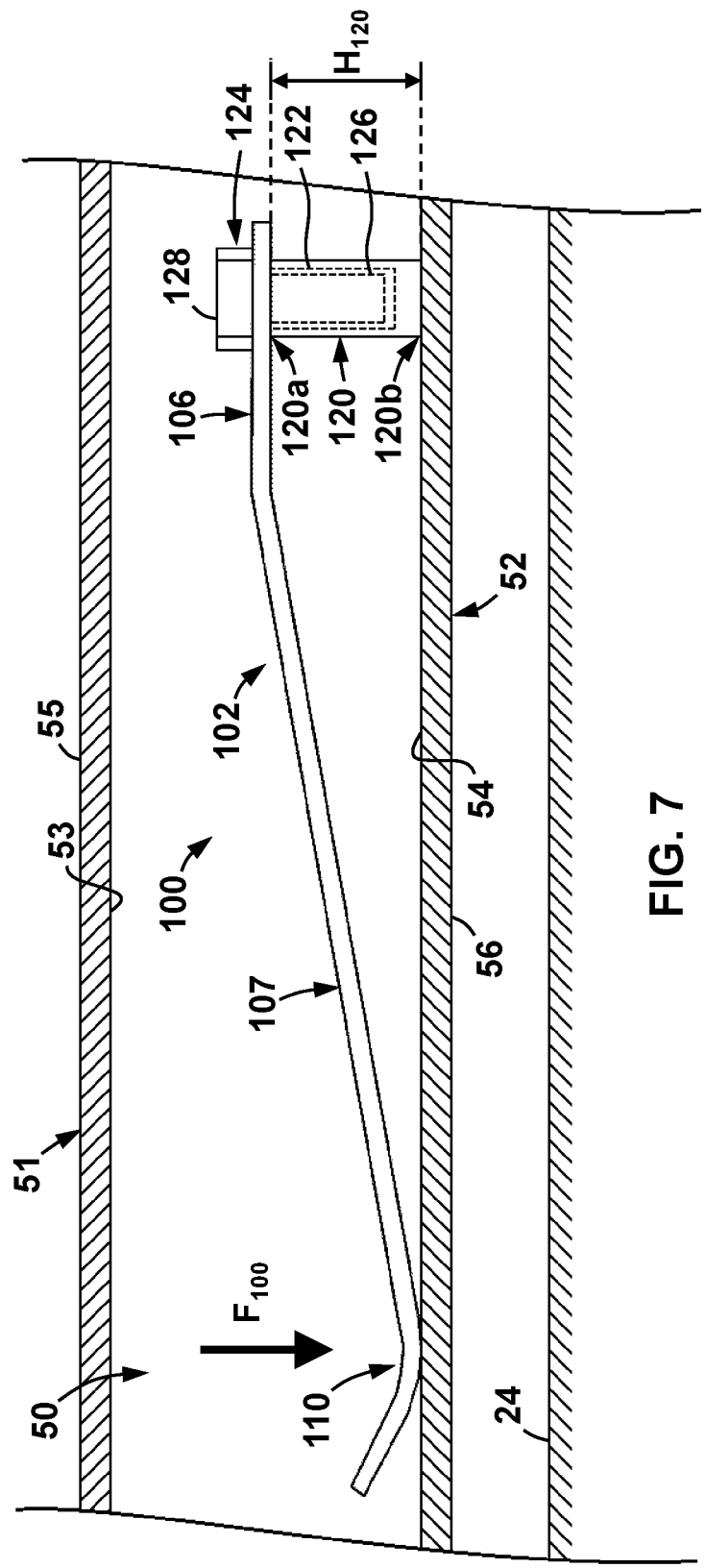
FIG. 7 is an enlarged side cross-sectional view of the internal cavity of the computing device of FIG. 1 according to some examples.

Referring specifically now to FIGS. 4, 6, and 7, during operations, biasing member 100 is installed within internal cavity 50 of second housing member 12 as previously described above. In particular, as best shown in FIG. 4, second housing member 12 includes a first or upper shell 51 and a second or lower shell 52 coupled to upper shell 51. Upper shell 51 includes an inner surface 53 and an outer surface 55. Similarly, lower shell 52 includes an inner surface 54 and an outer surface 56. Internal cavity 50 is defined between shells 51, 52—particularly between inner surface 53 of upper shell 51 and inner surface 54 of lower shell 52. In addition, feet 26 are mounted to outer surface 56 of lower shell 52. Shells 51, 52 may comprise any suitable material. For instance, in this example, shells 51, 52 may comprise a relatively compliant material such as, for example, a polymer.

In this example, biasing member 100 is installed within internal cavity 50 by securing mounting section 106 of biasing member 100 to a mounting post 120 extending from inner surface 54 of lower shell 52. As best shown in FIGS. 6 and 7, mounting post 120 has a first or upper end 120a, and a second or lower end 120b opposite upper end 120a. In this example, mounting post 120 extends normally from inner surface 54, and thus, a central or longitudinal axis 125 of post 120 extends perpendicularly (or orthogonally) from inner surface 54. Mounting post 120 also includes a threaded aperture 122 that extends axially into post 120 from upper end 120a.

As best shown in FIGS. 6 and 7, mounting section 106 of biasing member 100 is secured to mounting post 120 by inserting a threaded portion 126 of a screw 124 through aperture 104 in mounting section 106 and threadably engaging threaded portion 126 within threaded aperture 122 of post 120. Threaded portion 126 of screw 124 may be threadably advanced within threaded aperture 122 until mounting section 106 of biasing member 100 is axially compressed or captured between a head 128 of screw 124 and upper end 120a of post 120 along axis 125.

Post 120 has an axial height $H_{120}$ measured along axis 125 from lower end 120b to upper end 120a. In this example, the axial height $H_{120}$ is such that when mounting section 106 of biasing member 100 is secured to upper end 120a of post 120 via screw 124 as previously described, the curved foot 110 of engagement section 108 is engaged with and is deflected by inner surface 54 of lower shell 52. As shown in FIGS. 4 and 7, curved foot 110 is deflected relative to mounting section 106 in the normal direction with respect to inner surface 54 so that engagement section 108 is bent or deformed relative to mounting section 106. Specifically, the deformation of engagement section 108 may increase the angle α from its free or no load state previously described above. In some examples, the axial height $H_{120}$ of post may range from 3 to 12, or from 3 to 8. In addition, in some examples, when biasing member 100 is installed on post 120, the engagement section 108 may deform or deflect such that the angle α may increase by about 1° to about 60° from the free or no load state due to the deflection of foot 110 previously described above.

Accordingly, when biasing member 100 is installed within cavity 50 as previously described above, there is interference between curved foot 110 and inner surface 54. In other words, when biasing member 100 is installed on mounting post 120 as previously described, curved foot 110 would extend through surface 54 if no deformation of biasing member 100 could occur. The distance that curved foot 110 would extend through the inner surface 54 (again assuming no deflection of biasing member 100) in a direction that is perpendicular to inner surface 54 represents the interference of curved foot 110 during operations. In this example, the interference between curved foot 110 and inner surface 54 may range from 1-5 mm, or from 2-4 mm.

Referring now to FIGS. 3, 4, 6, and 7, the above described deformation of biasing member 100 during installation thereof on post 120 with cavity 50 is elastic in nature. Thus, biasing member 100 resists the deformation of engagement section 108 and the deflection of curved foot 110. As a result, biasing member 100 exerts a biasing force $F_{100}$ onto inner surface 54 of internal cavity 50. The biasing force $F_{100}$ is generally directed perpendicularly onto inner surface 54 in a direction that is away from upper shell 51 and outward from inner cavity 50 (i.e., in a direction that is opposite the deflection of curved foot 110). When computing device 10 is disposed on a support surface 24, the biasing force $F_{100}$ may be directed generally toward the support surface 24. In some examples, the biasing force $F_{100}$ may range from about 500 Gram-Force (gf) to about 1000 gf or from about 600 gf to about 900 gf.

In addition, biasing force $F_{100}$ may be sufficient to urge a foot or multiple feet 26 into engagement with support surface 24. For example, referring back now to FIGS. 3 and 4, biasing force $F_{100}$ may be sufficient to deform (e.g., bend) lower shell 52 (e.g., including inner surface 54 and outer surface 56), or at least the portion of lower shell 52 that is proximate biasing member 100 (particularly curved foot 110) toward support surface 24. As a result, the biasing force $F_{100}$ (and the resulting deformation of lower shell 52) may urge one or a plurality of feet 26 (or another portion or device of second housing member 12) into engagement with support surface 24. Specifically, in this example, the biasing force $F_{100}$ provided by biasing member 100 may locally deform lower shell 52 proximate biasing member 100 so that the height H of separation between foot 26' and support surface 24 shown in FIG. 3 may be zero or substantially zero.

In the above described example, biasing member 100 (particularly curved foot 110) interfered or engaged directly with inner surface 54 of lower shell 52 of second housing member 12. In other examples, curved foot 100 may indirectly engage with inner surface 54 via another surface or component (or multiple such surfaces, components, etc.). However, even in these examples, the biasing force F100 is provided or transferred to inner surface 54 and lower shell 52 so that lower shell 52 is deformed to urge feet 26 (or a foot 26') into engagement with support surface 24 in the manner described above.

Figure 8:
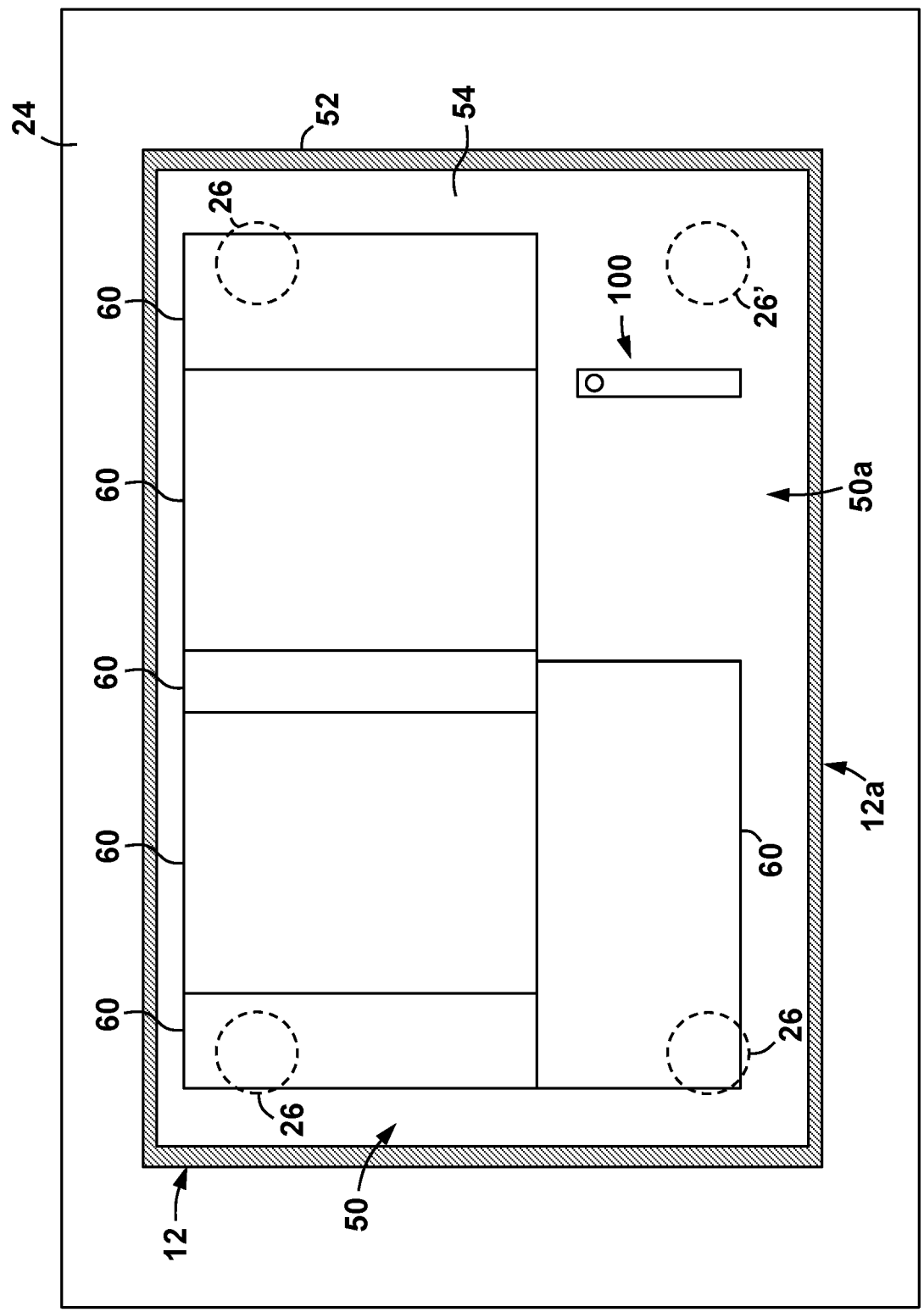
FIG. 8 is a schematic view of a second housing member of the computing device of FIG. 1 according to some examples.

Referring now to FIG. 8, biasing member 100 may be disposed at any suitable location within internal cavity 50 of second housing member 12. In some examples, biasing member 100 may be disposed at a location within internal cavity 50 that is relatively free of other components. As shown in FIG. 8, in this example, biasing member 100 is mounted within a region 50a of internal cavity 50 that is relatively free of other components 60. Components 60 may comprise a variety of components, modules, and systems that are present within a computing device (e.g., such as lap top computing device 10). For instance, components 60 may comprise power sources (e.g., batteries, capacitors, etc.), processors (e.g., microprocessor, central processing unit etc.), memory devices (e.g., a hard disk drive), switches, integrated circuits, cables, fans, heat sinks, etc. Region 50a may be completely free of such components 60 or may simply have a lower density of components 60 compared with other regions or sections of internal cavity 50.

Regardless of whether there are fewer or no such components 60 within region 50a of internal cavity 50, the local weight of second housing member 12 may be less within region 50a compared with other regions of cavity 50 that include a greater number of components 60. Thus, the foot 26' disposed under region 50a is prone to disengage from support surface 24 (e.g., by height H as shown in FIG. 3), such as, for example when first housing member 14 is rotated sufficiently far from second housing member 12 (e.g., so that the angle θ is greater than 90°) to shift the center of gravity of the computing device 10 away from leading edge 12a. Thus, the placement of biasing member 100 within region 50a may prevent the disengagement of foot 26' by deforming lower shell 52 proximate or at foot 26' toward support surface 24 in the manner described above. Accordingly, biasing member 100 may enhance the stability of computing device 10 on a support surface 24 without adding a significant amount of weight to the computing device 10 overall, and without the need to rearrange the components within cavity 50 to achieve a substantially uniform weight distribution therein (e.g., components 60).

Examples disclosed herein have utilized a biasing member 100 comprising a leaf spring to enhance the stability of computing device 10. However, other types of biasing members may be used in other examples.

Figure 9:
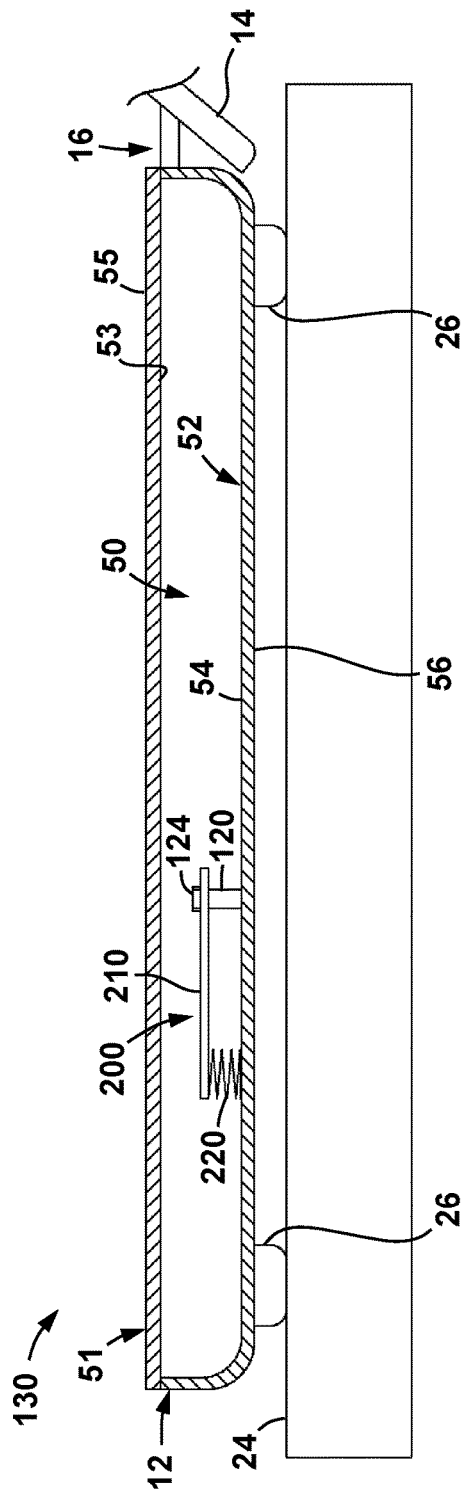
FIG. 9 is a side cross-sectional view of another computing device having a biasing member mounted therein according to some examples.
Figure 10:
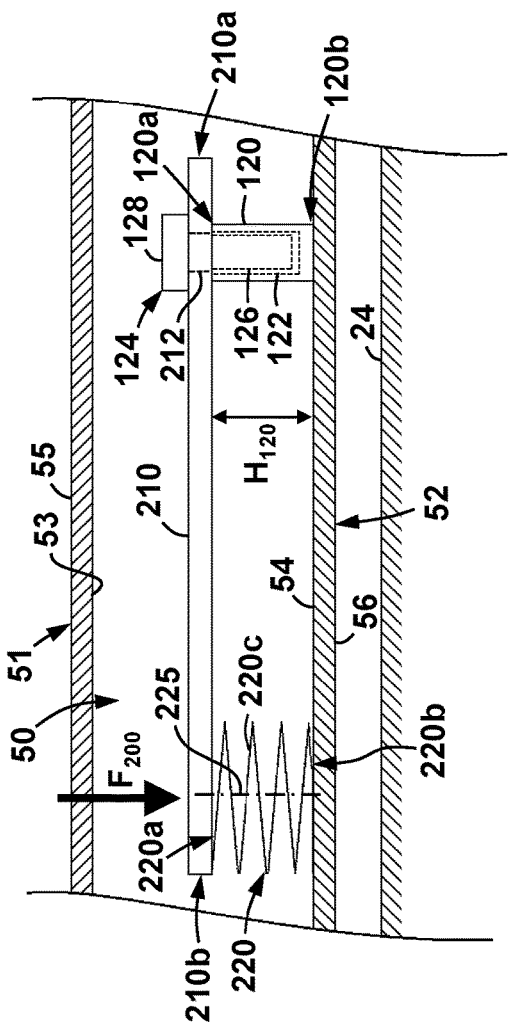
FIG. 10 is an enlarged side cross-sectional view of the computing device of FIG. 9 according to some examples.

For instance, referring now to FIGS. 9 and 10, another computing device 130 is shown. Computing device 130 is generally the same as computing device 10, and thus, shared features of computing device 10, 130 are designated in FIGS. 9 and 10 with the same reference numerals. However, in place of biasing member 100, computing device 130 includes a biasing member 200 that is installed within internal cavity 50 of second housing member 12. As with biasing member 100, biasing member 200 is to transfer a biasing force $F_{200}$ to lower shell 52 and thereby deform lower shell 52 to engage with support surface 24 during operations.

Biasing member 200 includes an elongate plank member 210 and a coiled spring 220. Plank member 210 includes a first or fixed end 210a, and a second or free end 210b opposite fixed end 210a. An aperture 212 extends through plank member 210 and is disposed proximate fixed end 210a (e.g., aperture 212 is more proximate fixed end 210a than free end 210b). During operations, plank member 210 is mounted within internal cavity 50 in a manner that is similar to that described above for body 102 of biasing member 100. Specifically, screw 124 is inserted through aperture 212 and threaded portion 126 of screw 124 is threadably engaged within threaded aperture 122 of mounting post 120 until plank member 210 is axially compressed or captured between head 128 of screw 124 and upper end 120a of mounting post 120.

Referring still to FIGS. 9 and 10, coiled spring 220 includes a central or longitudinal axis 225, a first end 220a and a second end 220b axially opposite first end 220a. In addition, coiled spring 220 includes a body 220c extending helically between ends 220a, 220b. In this example, coiled spring 220 is constructed from a length of coiled metallic wire; however, coiled spring 220 may be constructed from other materials in other examples (e.g., a polymer, a composite, etc.).

As best shown in FIG. 10, coiled spring 220 is installed between plank member 210 and inner surface 54 of lower shell 52 so that first end 220a is engaged with plank member 210, proximate free end 210b, and second end 220b is engaged with inner surface 54. In addition, the height $H_{120}$ of post 120 (which is previously described above) is such that when coiled spring 220 is installed between plank member 210 and inner surface 54 in the manner described, body 220c of coiled spring 220 is axially compressed along axis 225. Thus, once installed, coiled spring 220 bears axially outward against plank member 210 and lower shell 52. In this example, plank member 210 is constructed so as to resist deformation from the biasing force applied by coiled spring 220. As a result, when coiled spring 220 is axially compressed between plank member 210 and inner surface 54, a biasing force $F_{200}$ is applied to inner surface 54 generally in the direction of support surface 24. Therefore, biasing member 200 may cause a local deformation of lower shell 52 proximate biasing member 200 to thereby encourage engagement between second housing member 12 and support surface 24 (particularly a foot 26 or feet 26 coupled to second housing member 12) in the same manner as previously described above for biasing member 100.

In other example, other types of biasing members may be installed within internal cavity 50 to enhance the stability of computing device 10 as previously described above. For instance, in some examples, a torsional spring may be utilized to impart a similar biasing force to lower shell 52 (e.g., similar to biasing forces F100, F200, etc.). In other examples, a charged piston or diaphragm (e.g., a gas charged piston or diaphragm) may be utilized in internal cavity 50 to exert an appropriate biasing force to lower shell 52 (e.g., similar to biasing forces F100, F200, etc.).

In addition, while examples specifically discussed herein include a single biasing member (e.g., biasing members 100, 200) within internal cavity 50 of second housing member 12, it should be appreciated that the number and arrangement of biasing members may be greatly varied in other examples. For instance, in some example, internal cavity 50 may include a plurality of biasing members therein (e.g., a plurality of biasing members 100, a plurality of biasing members 200, a mixture of biasing members 100, 200, etc.).

Therefore, in the manner described above, a biasing member (e.g., biasing members 100, 200, etc.) may be mounted or installed within an internal cavity (e.g., internal cavity 50) of a computing device (e.g., computing device 10, 130) so as to urge the computing device (or a component thereof, such as, for example, second housing member 12 or feet 26) into engagement with an underlying support surface (e.g., support surface 24). Accordingly, by utilizing a biasing member within the internal cavity of a computing device as discussed herein, the stability of the computing device on the support surface may be improved.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A computing device, comprising:
   a first housing member; and
   a second housing member coupled to the first housing member with a hinge, wherein the first housing member is to rotate about the hinge to a plurality of positions relative to the second housing member, and wherein the second housing member comprises an internal cavity and a biasing member engaged with an inner surface within the internal cavity; and
   wherein when the computing device is disposed on a support surface, the second housing member is to engage with the support surface and the biasing member is to transfer a biasing force to the inner surface toward the support surface, and
   wherein the biasing force is substantially the same for each of the plurality of positions of the first housing member.

2. The computing device of claim 1, wherein the biasing member comprises a leaf spring engaged with the inner surface.

3. The computing device of claim 2, wherein the leaf spring comprises a body that is secured to a post extending from the inner surface, and wherein the body extends from the post to engage with the inner surface.

4. The computing device of claim 3, wherein the body comprises mounting section secured to the post and an engagement section that extends from the mounting section, and wherein the engagement section includes a curved foot to engage with the inner surface.

5. The computing device of claim 1, wherein the biasing member comprises a coiled spring engaged with the inner surface.

6. The computing device of claim 5, wherein the coiled spring is compressed between a plank member mounted within the internal cavity and the inner surface.

7. A computing device, comprising:
   a first housing member;
   a second housing member coupled to the first housing at a hinge, wherein the second housing member comprises a lower surface, and an internal cavity; and
   a biasing member disposed within the internal cavity, wherein the biasing member is to deform the lower surface, wherein the biasing member comprises a leaf spring.

8. The computing device of claim 7, wherein the leaf spring comprises a body that includes a fixed end and a free end opposite the fixed end, wherein the body is secured to a post within the internal cavity proximate the fixed end, and is engaged with an inner surface of the internal cavity proximate the free end.

9. The computing device of claim 7, wherein the leaf spring comprises:
   a mounting section secured to a post extending from the inner surface; and
   an engagement section that extends from the mounting section wherein the engagement section extends at an angle α to the mounting section that is greater than 90° and less than 180°.

10. The computing device of claim 9, wherein the engagement section includes a curved foot to engage with an inner surface of the internal cavity.

11. A computing device, comprising:
   a housing member to be placed on a support surface, wherein the housing member comprises an internal cavity; and
   a biasing member mounted within the internal cavity, wherein the biasing member is to engage with an inner surface of the internal cavity to deform the inner surface.

12. The computing device of claim 11, wherein when the housing is placed on the support surface, the biasing member is to deform the inner surface toward the support surface proximate the biasing member.

13. The computing device of claim 12, wherein the biasing member comprises a leaf spring.

14. The computing device of claim 12, wherein the biasing member comprises a coiled spring.

15. The computing device of claim 12, wherein the housing member supports a keyboard, and the computing device comprises second housing member that supports a display, wherein the second housing member is coupled to the housing member with a hinge.

* * * * *